(12) United States Patent
Ohshima

(10) Patent No.: US 7,212,687 B2
(45) Date of Patent: May 1, 2007

(54) METHOD AND APPARATUS FOR PROCESSING INFORMATION

(75) Inventor: Toshikazu Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 10/397,514

(22) Filed: Mar. 27, 2003

(65) Prior Publication Data
US 2003/0185461 A1    Oct. 2, 2003

(30) Foreign Application Priority Data
Mar. 29, 2002  (JP) .............................. 2002-095535

(51) Int. Cl.
G06K 9/20    (2006.01)
G06K 9/36    (2006.01)
H04N 1/46    (2006.01)

(52) U.S. Cl. ................... 382/284; 382/282; 358/540
(58) Field of Classification Search ............. 382/284, 382/282, 283, 294; 348/584, 581, 580; 358/540, 358/450, 538
See application file for complete search history.

(56) References Cited

U.S. PATENT DOCUMENTS

| | | | | |
|---|---|---|---|---|
| 4,835,532 A | * | 5/1989 | Fant .......................... | 345/611 |
| 5,581,377 A | * | 12/1996 | Shimizu et al. ............ | 358/540 |
| 5,953,076 A | | 9/1999 | Astle et al. ................. | 348/584 |
| 6,005,972 A | * | 12/1999 | Fredlund et al. ........... | 382/176 |
| RE37,668 E | * | 4/2002 | Etoh .......................... | 382/251 |
| 6,807,296 B2 | * | 10/2004 | Mishima .................... | 382/162 |
| 2001/0001020 A1 | * | 5/2001 | Mizuno ...................... | 382/282 |
| 2003/0012409 A1 | * | 1/2003 | Overton et al. ............ | 382/103 |

FOREIGN PATENT DOCUMENTS

| | | |
|---|---|---|
| EP | 0 537 945 A1 | 4/1993 |
| JP | 6-030336 | 2/1994 |
| JP | 2000-176675 | 6/2000 |
| WO | WO 97/03517 | 1/1997 |
| WO | WO 01/35641 A1 | 5/2001 |

OTHER PUBLICATIONS

"2001: An MR-Space Odyssey", Technical Report of IEICE (ISSN0913-5685, vol. 101, No. 389) MVE 2001-64 to 69 (Oct. 25, 2001) (with partial translation).
Feb. 22, 2006 European Search Report in European Application No. 03 25 2047.
Patent Abstracts of Japan, vol. 2000, No. 09, Oct. 13, 2000 (JP-A 2000-176675, Jun. 27, 2000).
Toshikazu Oshima, et al "2001: An MR-Space Odyssey Applying Mixed Reality Technology to VFX in Filmmaking", Technical Report of IEICE (ISSN0913-5685 vol. 101 No. 389) MVE 2001-65(Oct. 2001) (with full English-language translation) Oct. 25, 2001.

* cited by examiner

Primary Examiner—Yon J. Couso
(74) Attorney, Agent, or Firm—Fitzpatrick, Cella, Harper & Scinto

(57) ABSTRACT

When a CG object is overlapped onto a photographed real scenery image as a background and an image of a photographed real photographic subject is synthesized in front of the overlapped image, an image in which the photographed real background and the photographic subject are imaged simultaneously without imaging the photographed real background and the photographic subject independently, is synthesized with CG. A photographed real image including a specific image is acquired, and area information representing an area of the specific image from the photographed real image, and an area other than the area of the specific image of the photographed real image is synthesized with a computer graphics image using the area information so detected.

8 Claims, 7 Drawing Sheets

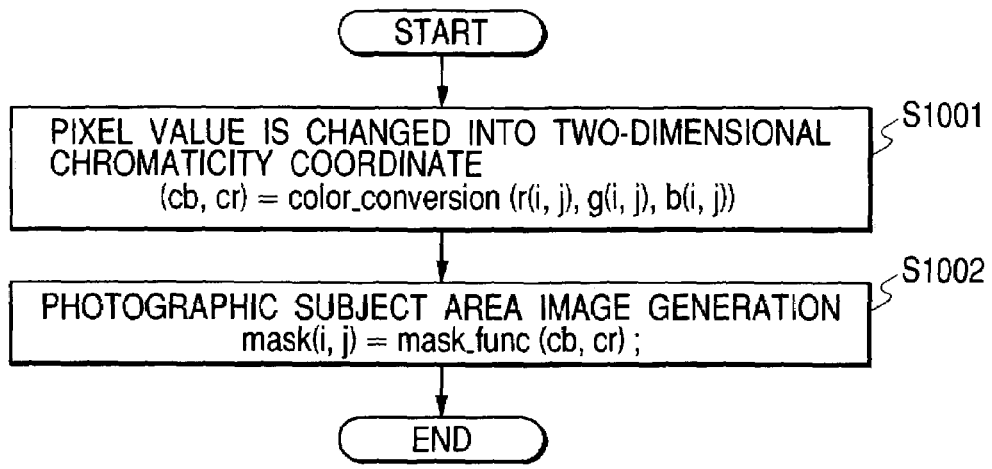
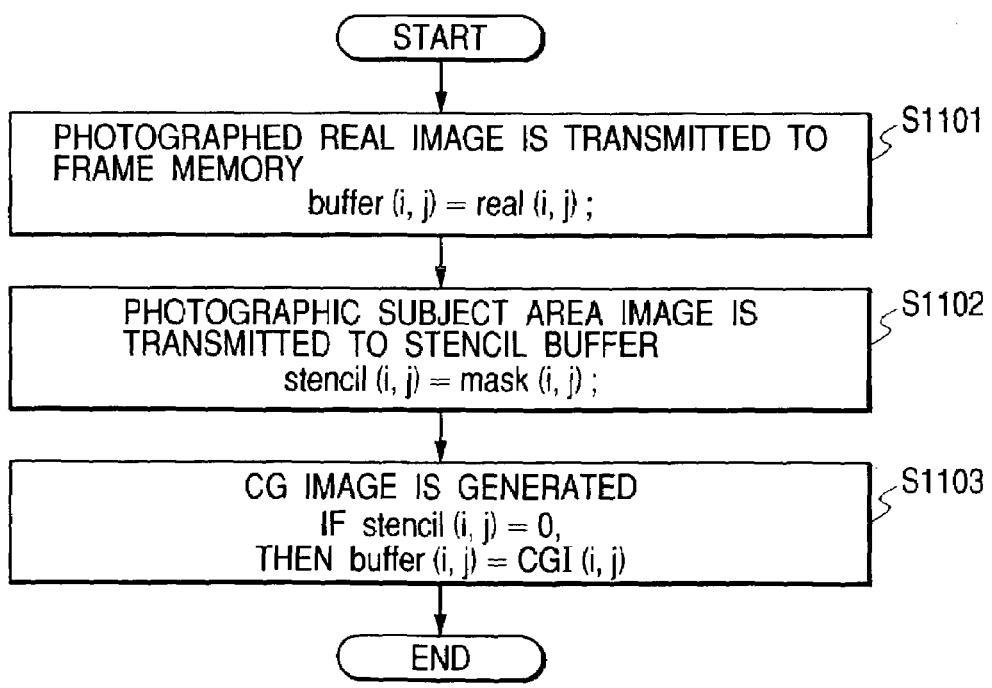

METHOD AND APPARATUS FOR PROCESSING INFORMATION

BACKGROUND OF THE INVENTION

1. Field of the Invention

The present invention relates to a technique in which a photographed real image and computer graphics are synthesized so that a specific image of the photographed real image is made as a foreground image.

2. Related Background Art

In the past, in the field of image production, such as a television program, a method has been used in which a specific area is cut out of a live image from a video camera using a chromakey method, and such area is synthesized with an image obtained by computer graphic, called a "CG image", has been used.

Now, such a method will be explained with reference to FIG. 1.

In conventional chromakey synthesis, a photographic subject 103 is arranged in front of a screen 102 (hereinafter, referred as "blue back" regardless of color) having a specific color which is substantially not present in the photographic subject 103 (generally, a sharp blue or green color) and a photographed real image is acquired by a camera as a foreground image 101.

Then, from the foreground image 101, a key image 106 is generated using the color of the blue back 102 as a reference. The key image is information for cutting out the area of the photographic subject 103 included in the foreground image 101, and, as can be seen from FIG. 1, a value for distinguishing the background from the photographic subject is set for each pixel unit.

On the other hand, a background image 104 is an image such as a still image, a video moving image or computer graphic and, unlike the photography of the foreground image 101, the usage of the blue back is not required in the background image.

Image synthesis processing 107 is represented by the following equation. That is to say, in the key image, for example, a value of the area of the photographic subject is shown as 1 and a value of the area of the background is shown as 0. It is assumed that a symbol for representing a pixel value of the key image is K, a pixel value for representing the foreground image is F, a pixel value for representing the background image is B and a pixel value for representing an output image is C. In this case, If K=0, then, C=B, and If K=1, then, C=F     (equation 1).

By such image synthesis processing 107, an image 108 is generated in which the photographic image 103 of the foreground image 101 is overlapped onto the background image 104.

As shown in FIG. 2, it is assumed that a virtual interior of a car, such as a CG steering wheel 204, is overlapped onto a photographed real scenery image 203 as the background, and a photographed real hand image 202 is synthesized as the foreground thereof.

In the above-mentioned conventional example, as shown in FIG. 1, only the foreground image 101 and background image 104 were considered and synthesis of three images as shown in FIG. 2 was not considered.

If the image shown in FIG. 2 is generated using the conventional technique, as shown in FIG. 3, the background image 203, CG steering wheel 204, CG inside car and photographed real hand image 202 must be prepared independently. In conventional chromakey processing, blue back 102 is required in order to photograph the photographic subject 103 as the foreground, and, thus, the photographic subject cannot be photographed simultaneously with the background image.

A problem in FIG. 3 is that, since the photographed real background image 203 and the photographed real hand image 202 are photographed by different cameras, if orientations and positions of the respective cameras are changed, a positional relationship deviates, and, thus, a natural-looking synthesized image cannot be obtained.

SUMMARY OF THE INVENTION

The present invention is made in consideration of the above problem, and an object of the present invention is to provide a synthesized image which is obtained from a photographed real image, including a specific image, and a computer graphics image, in which a photographed real image other than the specific image is used as a background and the computer graphics image and the specific image are used as a foreground and in which the respective images have proper positional relationships and appear to be natural.

For example, in the example shown in FIG. 2, the photographed real scenery image 203 and the photographed real hand image 202 are made to have the proper positional relationship, and the photographed real scenery image 203, the photographed real hand image 202 and the CG steering wheel 204 can be synthesized with a correct front-and-rear relationship.

To achieve the above object, the present invention has the following construction.

The present invention provides an information processing method for synthesizing a photographed real image including a specific image and a computer graphics image so that a photographed real image other than the specific image is used as a background and the computer graphics image and the specific image are used as a foreground. The method comprises the steps of acquiring the photographed real image, including the specific image, detecting area information representing an area of the specific image from the photographed real image, and generating a synthesized image in which an image of an area other than an area of the specific image is used as a background and the computer graphics image and the specific image are used as a foreground, by synthesizing the computer graphics image using the area information with respect to the area other than the area of the specific image of the photographed real image.

Other objects and features of the present invention will be apparent from the following detailed explanation of the present invention.

BRIEF DESCRIPTION OF THE DRAWINGS

FIG. 10 is a flow chart for explaining photographic subject area extraction processing; and FIG. 11 is a flow chart for explaining image synthesis processing.

DETAILED DESCRIPTION OF THE PREFERRED EMBODIMENTS

Now, an embodiment of the present invention will be explained with reference to the accompanying drawings.

Figure 4:
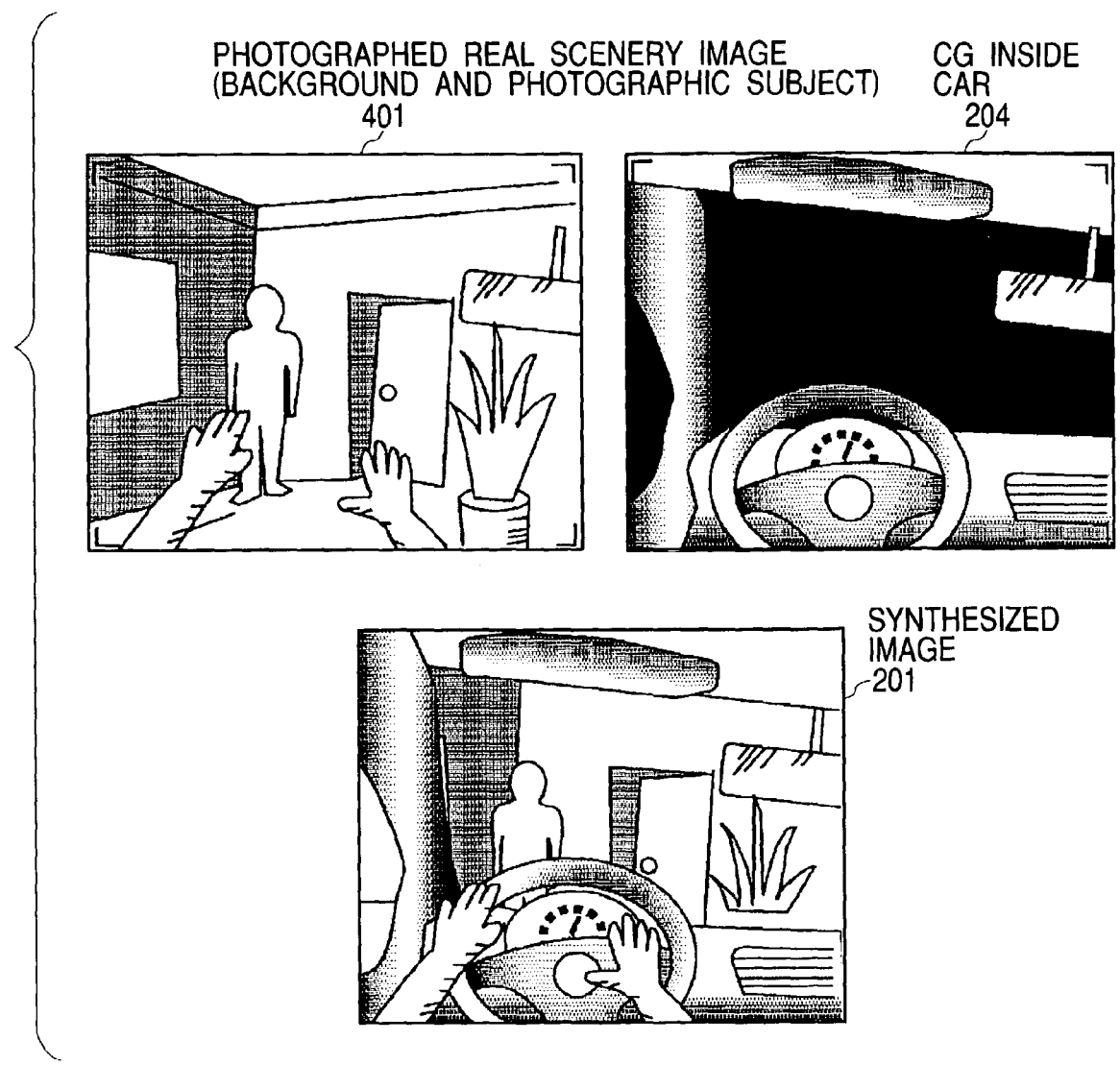
FIG. 4 is a view for explaining synthesis processing according to an embodiment of the present invention.

The object of the embodiment shown in FIG. 4 is to generate a synthesized image 201 from a photographed real scenery image 401, including both a background and a photographic subject, and a CG image 204.

Figure 5:
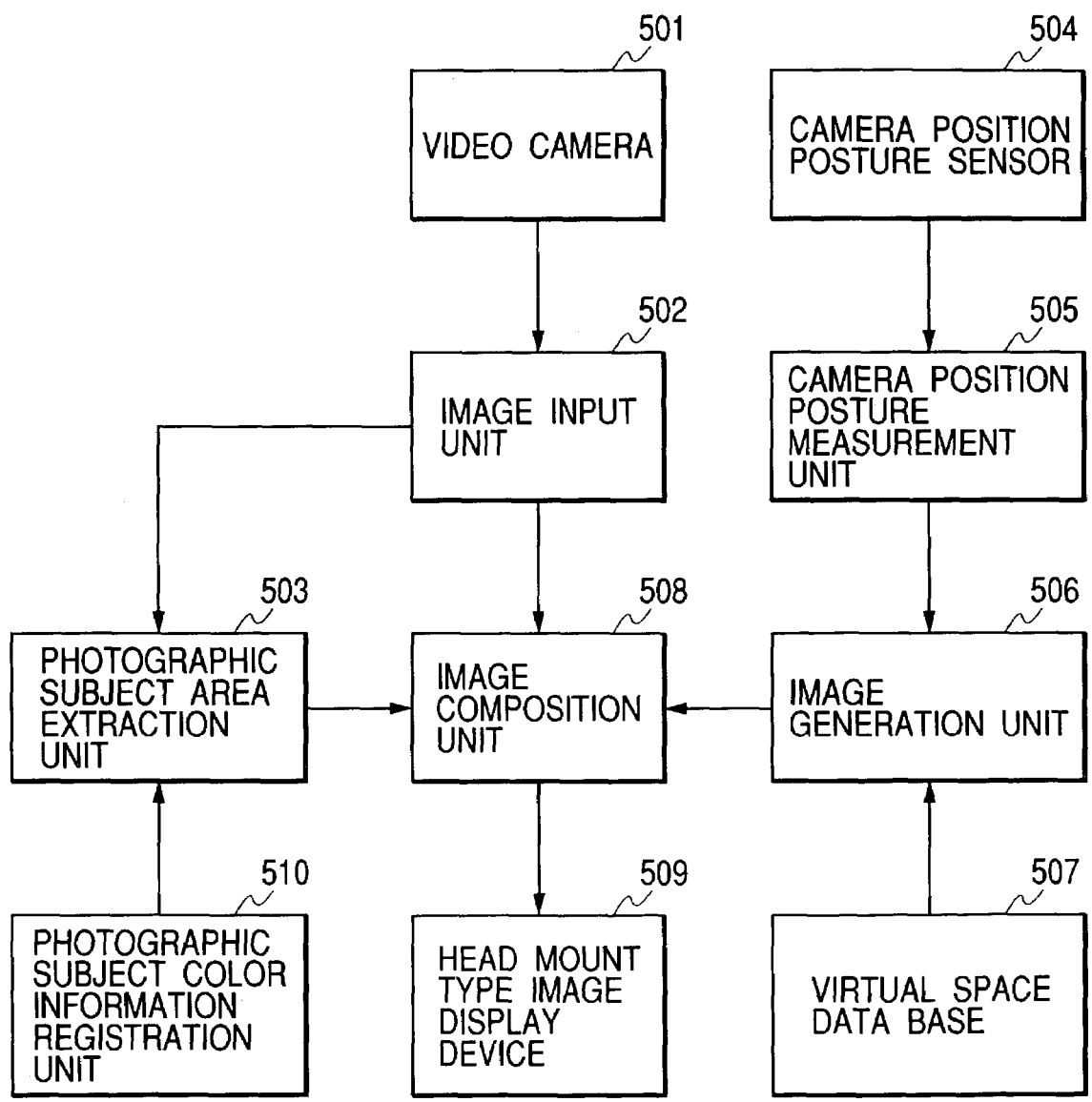
FIG. 5 is a view for showing a construction to explain data flow according to the present invention.
Figure 6:
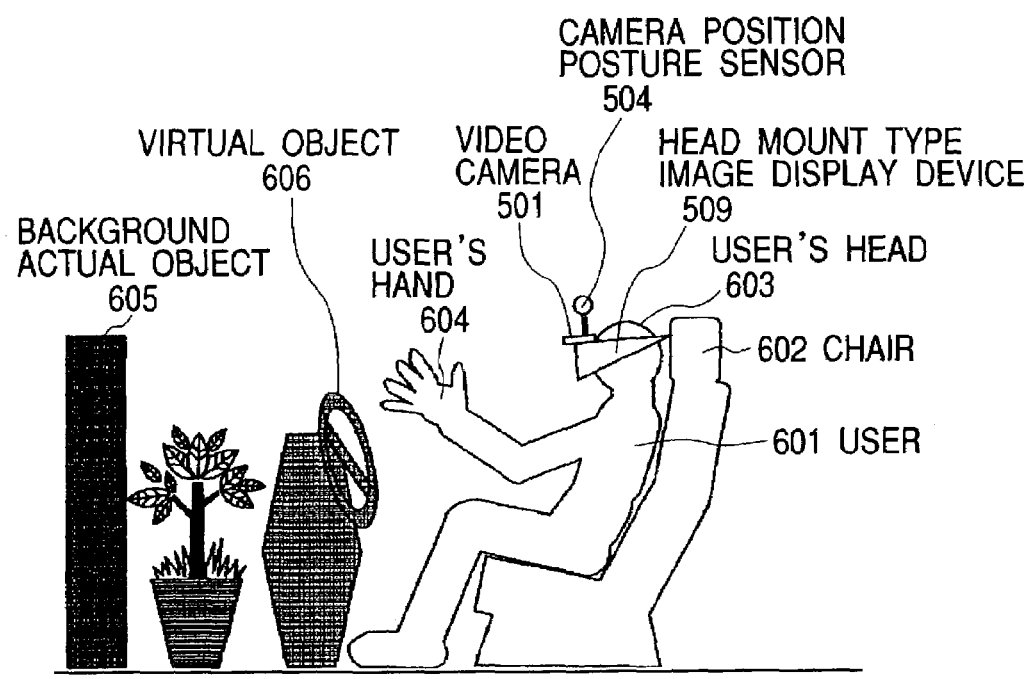
FIG. 6 is a view for showing a use of the present invention.

FIG. 5 is a view for showing a construction of an image synthesizing apparatus according to this embodiment. FIG. 6 is a view for explaining a use of the image synthesizing apparatus according to this embodiment.

A user 601 wears on his head 603 an image display apparatus 509 of a head mounting type (referred to as MD hereinafter) which is a display apparatus for synthesizing a photographed image and a computer graphic (CG) image and for displaying a synthesized image to the user while sitting on a chair 602. Of course, the user may assume a posture other than the sitting posture.

In the illustrated embodiment, the photographic subject to be used as the foreground is a hand 604 of the user 601 and real objects to be used as the background are walls, a potted plant and the like 605.

A small video camera 501 is secured to the HMD 509 in the vicinity of the eyes so that a shooting direction of the camera coincides with a viewing direction of the user 601. Further, a signal of an image photographed by the video camera 501 is processed by an image input unit 502 and is then supplied to a photographic subject area extraction unit 503 (described later) and an image composition unit 508 (described later) as digital image data and is then synthesized with the CG to be displayed on the HMD 509 worn by the user.

A camera position posture sensor 504, comprised of a magnetic sensor, for example, is mounted to the HMD 509. An output signal from the camera position posture sensor 504 is input to a camera position posture measurement unit 505, thereby estimating a position and a posture of the camera. Any preferred means, such as an optical sensor, an ultrasonic sensor, a mechanical sensor and the like, may be selected voluntarily as the camera position posture sensor 504, taking into consideration the application.

The photographic subject area extraction unit 503 compares color information of each pixel of the image data supplied from the image input unit 502 with color information of the photographic subject registered in a photographic subject color information registration unit 510, and judges that the pixel is in an area of the photographic subject if the former information coincides with the latter information. Regarding a result of judgment whether each pixel is included in the photographic subject or not, for example, values are assigned so that the value becomes 1 if the pixel is included in the photographic subject and the value becomes 0 if the pixel is not included in the photographic subject, and such result is supplied to the image composition unit 508 in the form of image data.

Figure 7:
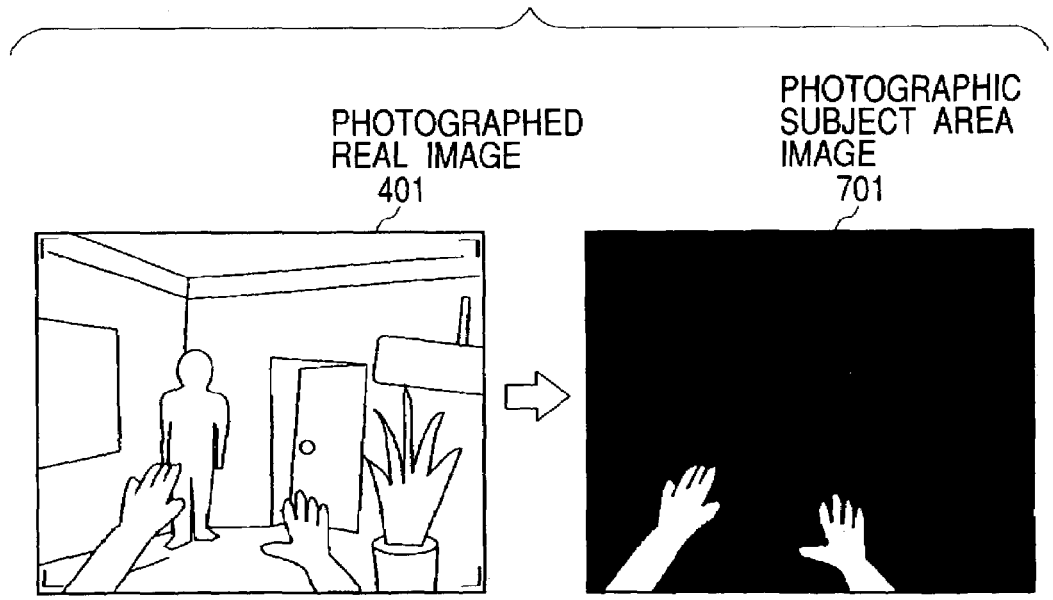
FIG. 7 is a view for explaining extraction of a photographic subject area.

FIG. 7 is a view for explaining extraction of the photographic subject area. The photographed real image 401 is an example of an image observed from the video camera 501 in FIG. 6. In the photographed real image 401, the user 601 is trying to observe his hands through the video camera 501, and the hands, as the photographic subject to be used as the foreground, are being observed, together with the real scenery image to be used as the background.

The color information of the hand 604, as the photographic subject, is previously registered in the photographic subject color information registration unit 510, and the color information for each pixel of the photographed real image 401 is compared with the color information of the photographic subject, thereby generating an image in which the value of the pixel becomes 1 if the pixel is included in the photographic subject area and the value of the pixel becomes 0 if the pixel is not included in the photographic subject area. A photographic subject area image 701 is an image generated by analyzing the photographed real image 401 in this way, and a white area indicates the area of the hands as the photographic subject.

The color information used in the photographic subject area extraction unit 503 and the photographic subject color information registration unit 510 can be described as coordinate values in a multi-dimensional color space. Various kinds of color systems are generally well known such as RGB, YIQ, YCbCr, YUV, HSV, Lu*v*, La*b* and the like (JIS Color Handbook published by Nippon Kikaku Kyokai (Japan Standard Association)).

Although any appropriate color system may be used in accordance with the color property of the photographic subject of interest, in the illustrated embodiment, it is desirable to use a color system of the type which can be divided into luminance information and color phase information in order to cancel any change in the color property of the photographic subject due to differences in illuminating conditions, so that the color phase information alone is utilized. Such a color system is generally represented by YIQ or YCbCr. In the illustrated embodiment, a YCbCr color system is used.

Figure 8:
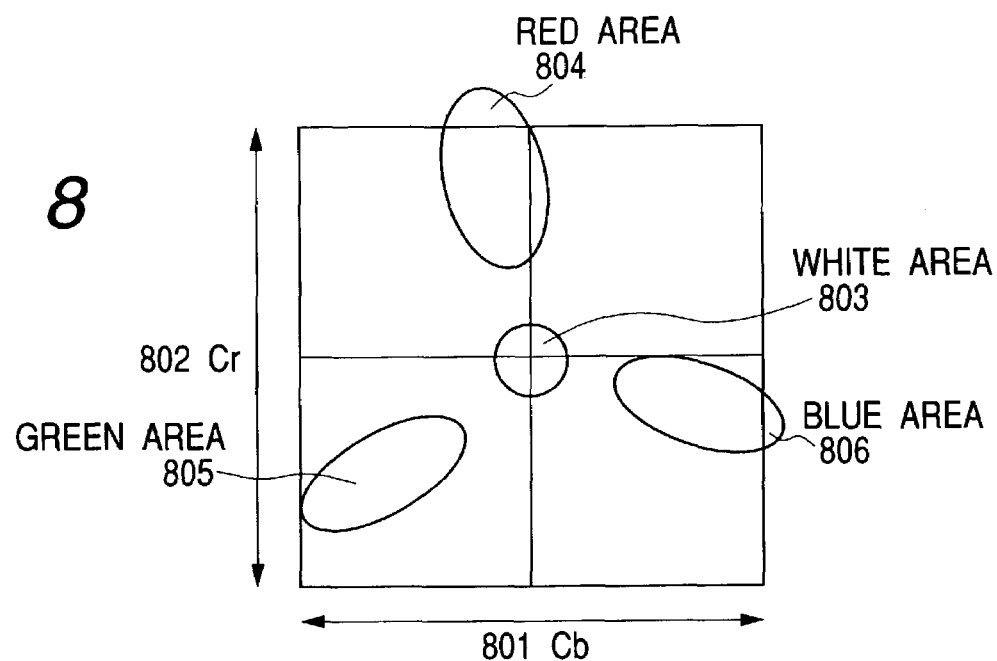
FIG. 8 is a view for explaining a description of color information in a YCbCr color indicating system.
Figure 9:
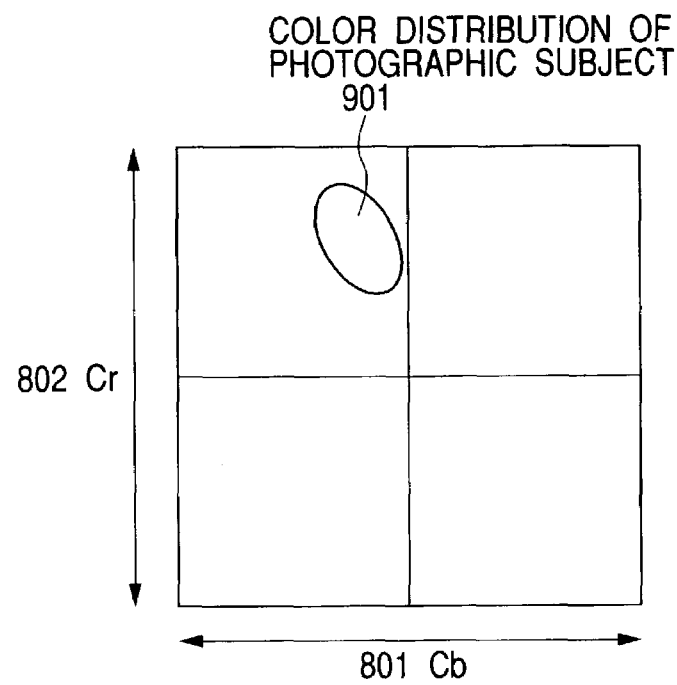
FIG. 9 is a view for showing a distribution example of color information of a photographic subject in the YCbCr color indicating system.

FIG. 8 schematically shows color distribution in a CbCr plane of the YCbCr color system. The abscissa 801 indicates Cb and the ordinate 802 indicates Cr. A central part 803 is a white area. Color saturation is increased from the central part toward a peripheral part. FIG. 9 shows an example in which the color information of the photographic subject is expressed as color space coordinate distribution 901 in the CbCr plane of the YCbCr color system.

Although it is desirable that the color information of the photographic subject not be included in the color information of the background, it can be understood, under certain conditions, that it is difficult to distinguish the photographic subject from the background by color. In such a case, a reasonable or convenient color may be assigned to the photographic subject, for example, by wearing colored gloves on the hands.

As a method for registering the color information in the photographic subject color information registration unit 510, a method in which an image is acquired by observing the photographic subject by means of a camera and respective pixel values are described as distribution in the CbCr plane and then coordinate ranges of respective axes of the color space are designated or a method (so-called look-up table) in which respective axes of the color space are formed as a specimen and values indicating whether respective points on the axes are included in the photographic subject or not may be used.

Next, processing in the photographic subject area extraction unit 503 will be explained with reference to FIG. 10. Processing shown in FIG. 10 is performed with respect to each pixel of the image data supplied from the image input unit 502, thereby extracting the area of the photographic subject.

First of all, in step S1001, an RGB value of the image coordinate (i, j) is converted into YCbCr style, thereby converting it into a coordinate value (cb, cr) in the CbCr plane.

In a step S1002, the color distribution 901 of the photographic subject registered in the photographic subject color information registration unit 510 is referred to using the coordinate value (cb, cr) in the CbCr plane as input, thereby judging whether input color is included in the area of the color distribution of the photographic subject or not. Regarding a judged result, for example, a binary code is used. Namely, if the color is included in the photographic subject color distribution 901, the value is indicated as 1, and, if not included, the value is indicated as 0. Alternatively, the judged result may be expressed by probable distribution using continuous values from 0 to 1.

In the illustrated embodiments while an example in which the image data supplied from the image input unit 502 is described in the RGB style was explained, the image data may be described by YIQ or YUV. In this case, step S1001 is omitted, and, the same effect can be obtained by inputting a coordinate value of an IQ or UV space to (Cb, Cr) the step S1002.

In the image generation unit 506, by using information regarding three-dimensional position and posture of the camera supplied from the camera position posture measurement unit 505, a three-dimensional CG image is generated using geometrical information of a CG model and attribution information of color and/or texture and illumination information, corresponding to the image photographed by the video camera 501. Since generation of a three-dimensional CG image is well known, explanation thereof will be omitted.

In the image composition unit 508, by using the photographic subject area image 701 supplied from the photographic subject area extraction unit 503, a target synthesized image 201 is generated from the photographed real image 401 supplied from the image input unit 502 and the Cg image 204 supplied from the image generation unit 506.

Now, the image synthesized processing in the image composition unit 508 will be explained with reference to FIG. 11. In step S1101, the photographed real image 401 is transmitted to a frame buffer, as an image memory, for displaying the image. In step S1102, the photographic subject area image 701 generated in the photographic subject area extraction unit 510 is transmitted to a stencil buffer, as an image memory, for mask processing.

In step S1103, a CG image 204 is generated, and, regarding the pixel of each of coordinates (i, j) constituting the generated CG image, the following descriptions are expressed in the frame buffer by referencing a value Stencil (i, j) in the stencil buffer. That is to say:

If Stencil (i, j)=1, i.e., if the pixel real (i, j) in the photographed real image is included in the photographic subject area, the corresponding pixel buffer (i, j) in the frame buffer is not updated.

On the other hand, if Stencil (i, j)=0, i.e., if the pixel real (i, j) in the photographed real image is not included in the photographic subject area, the value of buffer (i, j) is substituted for the pixel value CGI (i, j) of the CG image.

As a result, in the photographic subject area, the pixel value of the photographed real image is always written in the frame buffer, and, in the area other than the photographic subject area, only regarding the portion with which the CG is overlapped, the pixel value of the CG image is written in the frame buffer. Further, regarding the area which is not the photographic subject area and with which CG is not overlapped, the photographed real image is written in the frame buffer.

In this way, in image synthesis processing according to the illustrated embodiment, a drawing of the CG image in the frame memory in which the photographed real image is written is controlled by using the photographic subject area image 701 held in the stencil buffer as mask data. Using the illustrated embodiment, synthesis processing can be performed at a high speed.

Figure 1:
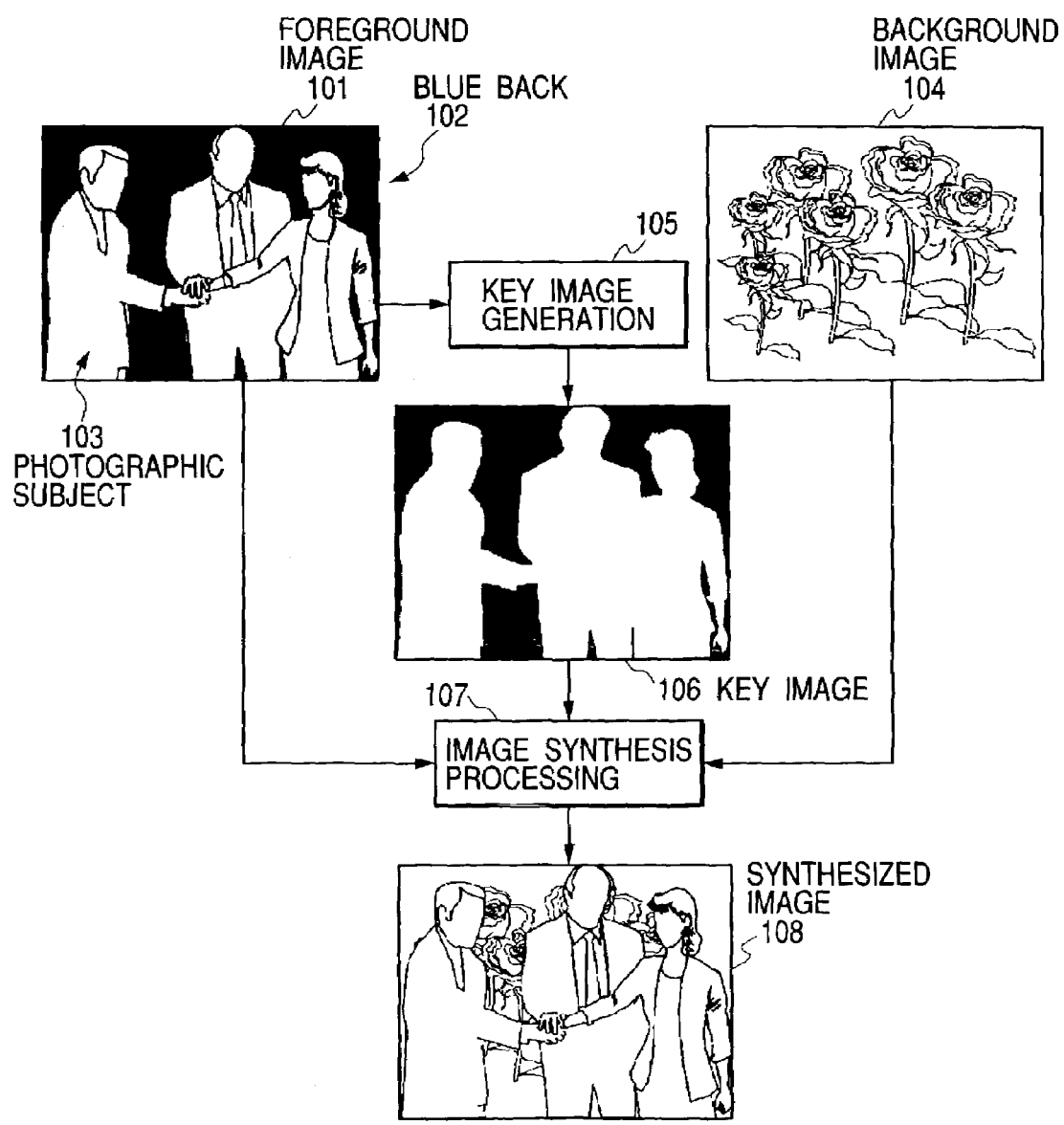
FIG. 1 is a view for explaining an example of conventional chromakey synthesis.
Figure 2:
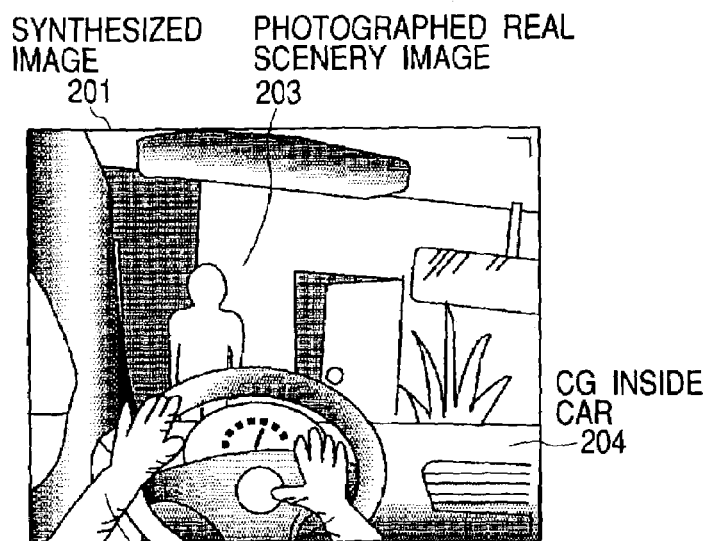
FIG. 2 is a view for showing an example of a synthesized image of interest.
Figure 3:
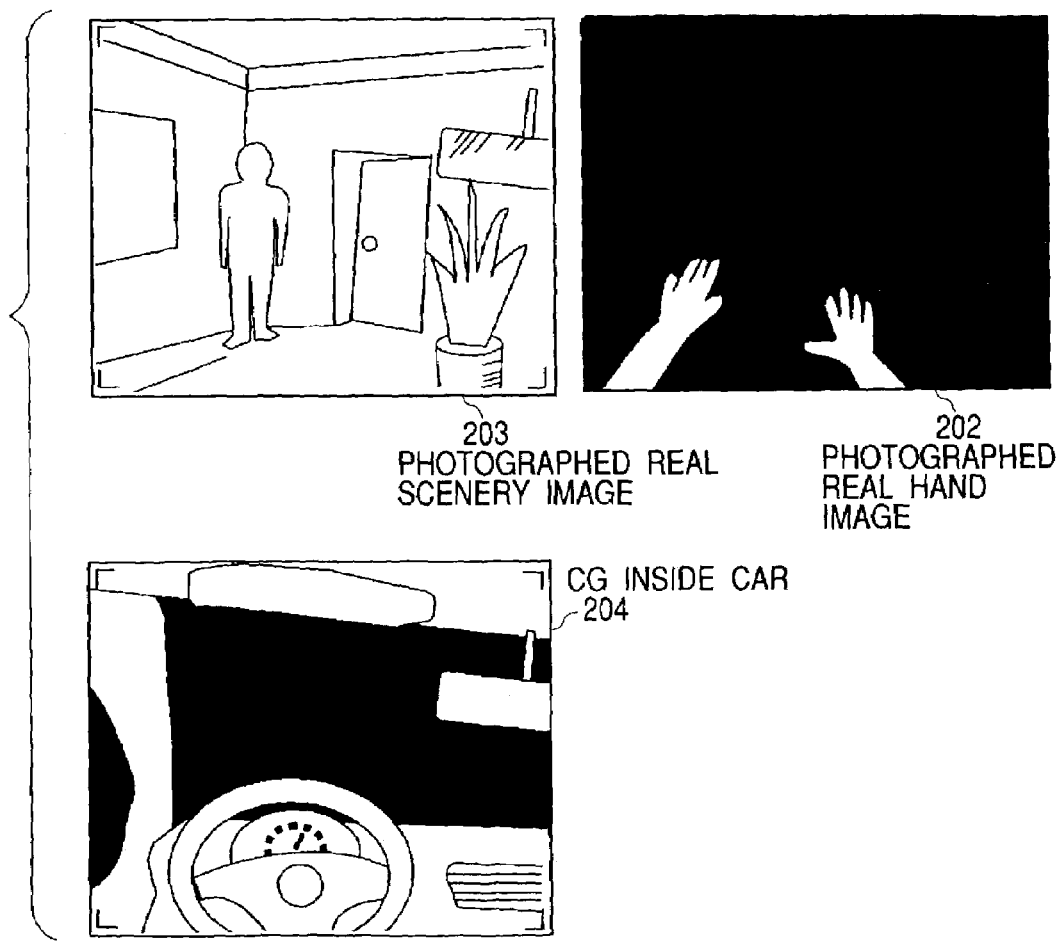
FIG. 3 is a view for explaining conventional chromakey synthesis.

Further, the user who wears the display apparatus of head mounting type can observe the CG virtual object in real space as the background, as is in the synthesized image 201 shown in FIG. 2, and can see a condition that his hands are disposed in front of the virtual image.

Further, since the photographic subject (specific image) and the photographed real scenery image (photographed real image other than the specific image) can be photographed by the same video camera, the positional relationship between the photographic subject and the photographed real scenery image can be prevented from deviating. Further, since a CG image is generated and synthesized in accordance with the output of the camera position posture sensor, the proper positional relationship between the CG image and the photographed real image can be maintained.

In this way, according to the illustrated embodiment, from the photographed real image including the specific image and the computer graphics image, a synthesized image, in which a photographed real image other than the specific image is used as the background and a computer graphics image and the specific image are used as the foreground, can be generated so that the respective images have proper positional relationships and appear to be natural.

OTHER EMBODIMENTS

It should be noted that the object of the above-mentioned embodiment can be achieved by supplying a storing medium (or a recording medium) storing a program code of software for realizing the function of the above-mentioned embodiment to a system or an apparatus and by reading out and executing the program code stored in the storing medium by means of a computer (or CPU or MPU) of the system or the apparatus.

In this case, the program code itself read out from the storing medium realizes the function of the above-mentioned embodiment, and the storing medium storing the program code constitutes the above-mentioned embodiment.

Further, it should be noted that the present invention includes a concept that, by executing the program code read out by the computer, not only the function of the above-mentioned embodiment is realized, but also the function of the above-mentioned embodiment is realized by executing actual processing partially or totally by means of an operating system (OS) working on the computer on the basis of instruction of the program code.

Further, it should be noted that the present invention includes a concept that actual processing is executed partially or totally by a CPU of a function expansion card inserted into the computer or of a function expansion unit connected to the computer on the basis of the program code read out from the storing medium, thereby realizing the function of the above-mentioned embodiment.

When the above-mentioned embodiments are applied to the storing medium, the storing medium stores a program code corresponding to a part or all of the block diagram and the flow charts shown in FIG. 5 and FIGS. 10 and 11.

What is claimed is:

1. An information processing method for synthesizing (a) a photographed real image including a specific image and (b) a computer graphics image, so that a photographed real image other than the specific image is used as a background and the computer graphics image and the specific image are used as a foreground, comprising the steps of:

acquiring a photographed real image including the specific image;

detecting area information representing an area of the specific image from the photographed real image based on predetermined color information; and generating a synthesized image in which an image of an area other than an area of the specific image is used as a background and the computer graphics image and the specific image are used as a foreground, by overwriting the computer graphics image, except for an image in an area corresponding to the area of the specific image, on the photographed real image.

2. An information processing method according to claim 1, wherein the photographed real image is taken by a photo-taking unit at an actual time.

3. An information processing method according to claim 1, further comprising the steps of:

acquiring positional information of the photo-taking unit; and generating the computer graphics image in accordance with the positional information.

4. An information processing method according to claim 1, wherein the area information is sought by comparing color information of each pixel of the photographed real image with set color information of the specific image.

5. A computer program embodied in a computer-readable medium and comprising computer-executable code for realizing an information processing method according to claim 1.

6. An information processing apparatus for synthesizing and displaying so that a photographed real scenery image is used as a background and a computer graphics image and a photographed real photographic subject are used as a foreground, said apparatus comprising:

a photo-taking unit for photo-taking the photographed real scenery image at an actual time;

a position posture measurement unit for measuring position and rotation information of said photo-taking unit;

a computer graphics image generation unit for generating the computer graphics image;

a detection unit for detecting a photographic subject area from the photographed real scenery image based on predetermined color information;

an image composition unit for overwriting the computer graphics image, except for an image in an area corresponding to the photographic subject area, on the photographed real scenery image on the basis of the photographic subject area detected by said detection unit; and an image display unit for displaying a synthesized image output from said image composition unit.

7. An information processing apparatus according to claim 6, wherein said image display unit is a head mounting type display.

8. An information processing apparatus according to claim 6, wherein said photo-taking unit and said position posture measurement unit are secured to said image display unit.

* * * * *

UNITED STATES PATENT AND TRADEMARK OFFICE
CERTIFICATE OF CORRECTION

PATENT NO.       : 7,212,687 B2
APPLICATION NO.  : 10/397514
DATED            : May 1, 2007
INVENTOR(S)      : Toshikazu Ohshima It is certified that error appears in the above-identified patent and that said Letters Patent is hereby corrected as shown below:

COLUMN 3:
Line 29, "MD" should read --HMD--.

COLUMN 5:
Line 27, "embodiments" should read --embodiment,--.
Line 49, "Cg" should read --CG--.

Signed and Sealed this

Twenty-fifth Day of March, 2008

JON W. DUDAS
*Director of the United States Patent and Trademark Office*